United States Patent
Abraham et al.

(10) Patent No.: US 12,130,962 B2
(45) Date of Patent: *Oct. 29, 2024

(54) INITIATING ACTIONS RESPONSIVE TO USER EXPRESSIONS OF A USER WHILE READING MEDIA CONTENT

(71) Applicant: INTERNATIONAL BUSINESS MACHINES CORPORATION, Armonk, NY (US)

(72) Inventors: Subil M. Abraham, Lewisville, TX (US); James P. Appleyard, Grapevine, TX (US); Pratik A. Naik, Dallas, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 343 days.

This patent is subject to a terminal disclaimer.

(21) Appl. No.: 16/846,655

(22) Filed: Apr. 13, 2020

(65) Prior Publication Data
US 2020/0241638 A1    Jul. 30, 2020

Related U.S. Application Data

(63) Continuation of application No. 16/409,874, filed on May 13, 2019, now Pat. No. 10,656,708, which is a
(Continued)

(51) Int. Cl.
*G06F 3/01*      (2006.01)
*G06F 3/00*      (2006.01)
(Continued)

(52) U.S. Cl.
CPC .............. *G06F 3/013* (2013.01); *G06F 3/005* (2013.01); *G06F 3/0483* (2013.01);
(Continued)

(58) Field of Classification Search
None
See application file for complete search history.

(56) References Cited

U.S. PATENT DOCUMENTS 7,020,663 B2   3/2006   Hay
8,094,122 B2   1/2012   Molander
(Continued)

FOREIGN PATENT DOCUMENTS

CN    102238197 A    11/2011

OTHER PUBLICATIONS

Siddique, A., "Google Glass Features; How Medical Uses Will Revolutionize Your Healthcare [video]", [online] Medical Daily, IBt Media Inc. © 2015, Mar. 12, 2013, retrieved from the Internet: <http://www.medicaldaily.com/google-glass-features-how-medical-uses-will-revolutionize-your-healthcarevideo-244613>, 18 pg.
(Continued)

*Primary Examiner* — Benjamin C Lee
*Assistant Examiner* — Emily J Frank
(74) *Attorney, Agent, or Firm* — CUENOT, FORSYTHE & KIM, LLC

(57) ABSTRACT

First media content including text is presented on a display. User expressions of a user, including eye movement, are tracked by an image detector while the user is reading the text of the first media content. User expression data is generated based on the user expressions of the user. A determination can be made as to whether the user expression data indicates that the user gazes at a portion of the text presented on the display for a period exceeding a threshold value. Responsive to determining that the user expression data indicates that the user gazes at a portion of the text presented on the display for a period exceeding a threshold value, one or more actions can be automatically initiated.
(Continued)

For example, additional media content that provides further explanation of the media content can be presented.

17 Claims, 6 Drawing Sheets

Related U.S. Application Data continuation of application No. 14/732,443, filed on Jun. 5, 2015, now Pat. No. 10,317,994.

(51) Int. Cl.

| | | |
|---|---|---|
| *G06F 3/0483* | (2013.01) | |
| *G06F 16/13* | (2019.01) | |
| *G06F 40/134* | (2020.01) | |
| *G06F 40/169* | (2020.01) | |
| *G06F 40/205* | (2020.01) | |

(52) U.S. Cl.
CPC .......... *G06F 16/134* (2019.01); *G06F 40/134* (2020.01); *G06F 40/169* (2020.01); *G06F 40/205* (2020.01); *G06F 2203/011* (2013.01)

(56) References Cited

U.S. PATENT DOCUMENTS

| | | | |
|---|---|---|---|
| 8,690,578 B1 | 4/2014 | Nusbaum | |
| 9,817,477 B1 | 11/2017 | Taylor | |
| 9,836,889 B2 | 12/2017 | Sugden | |
| 10,317,994 B2* | 6/2019 | Abraham | G06F 3/013 |
| 10,656,708 B2* | 5/2020 | Abraham | G06F 3/0483 |
| 10,656,709 B2* | 5/2020 | Abraham | G06F 3/0483 |
| 2011/0066636 A1* | 3/2011 | Guido | H04L 67/146 |
| | | | 707/769 |
| 2011/0098056 A1* | 4/2011 | Rhoads | G06F 3/011 |
| | | | 345/173 |
| 2011/0205148 A1 | 8/2011 | Corriveau | |
| 2012/0203640 A1* | 8/2012 | Karmarkar | G06F 1/1694 |
| | | | 705/14.66 |
| 2012/0240141 A1 | 9/2012 | Sim | |
| 2012/0290512 A1* | 11/2012 | Frank | G06N 20/00 |
| | | | 706/12 |
| 2013/0021373 A1* | 1/2013 | Vaught | G06F 3/013 |
| | | | 345/633 |
| 2013/0088511 A1 | 4/2013 | Mitra | |
| 2013/0273506 A1 | 10/2013 | Melowsky | |
| 2014/0038154 A1 | 2/2014 | Brownlow | |
| 2014/0068406 A1* | 3/2014 | Kornacki | G06F 16/48 |
| | | | 715/230 |
| 2014/0068428 A1 | 3/2014 | Puppin | |
| 2014/0168056 A1 | 6/2014 | Swaminathan | |
| 2014/0310256 A1 | 10/2014 | Olsson | |
| 2014/0315162 A1 | 10/2014 | Ehrenkranz | |
| 2015/0042552 A1* | 2/2015 | Tsoref | G06F 3/0304 |
| | | | 345/156 |
| 2015/0070262 A1* | 3/2015 | Peters | G06F 3/013 |
| | | | 345/156 |
| 2015/0169048 A1 | 6/2015 | Peterson | |
| 2015/0186346 A1* | 7/2015 | Mesguich Havilio | |
| | | | G06F 3/0488 |
| | | | 715/256 |
| 2015/0277552 A1* | 10/2015 | Wilairat | G11B 27/28 |
| | | | 386/244 |
| 2015/0278179 A1* | 10/2015 | Aggarwal | G06F 40/169 |
| | | | 715/231 |
| 2015/0379770 A1* | 12/2015 | Haley, Jr. | G09G 5/006 |
| | | | 345/633 |
| 2016/0098479 A1* | 4/2016 | Anwar | G06F 16/36 |
| | | | 707/777 |
| 2016/0133154 A1 | 5/2016 | Cortes | |
| 2016/0171277 A1 | 6/2016 | Flawn | |
| 2016/0357253 A1 | 12/2016 | Abraham | |
| 2017/0228018 A1 | 8/2017 | Schaeferjohann | |
| 2019/0265790 A1 | 8/2019 | Abraham | |
| 2019/0265791 A1 | 8/2019 | Abraham | |
| 2019/0331927 A1 | 10/2019 | Yoshida | |

OTHER PUBLICATIONS

"Tracking Dietary Intake Patterns Of Individuals Using Social Media", Ip.Com Prior Art Database, Disclosure No. 000231487D, Oct. 2, 2013, 5 pg.

IBM Corporation, "Smart Planet: Smarter Food Supply & Aid", IP.Com Prior Art Database, Disclosure No. 000192686, Jan. 28, 2010, 7 pg.

Dignan, L., "Amazon updates Kindle apps with Whispersync for Voice, Audible" [online] ZDNet, CBS Interactive © 2015, Jun. 10, 2014, retrieved from the Internet: <http://www.zdnet.com/article/amazon-updates-kindle-apps-with-whispersync-for-voice-audible/>, 2 pg.

"Active E-reader Data Capture—Using Emoticons During Content Consumption", IP.Com Prior Art Database, Disclosure No. IPCOM000227967D, May 30, 2013, 1 pg.

Abraham, S.M. et al., "Initiating Actions Responsive to User Expressions of a User While Reading Media Content", U.S. Appl. No. 14/732,443, filed Jun. 5, 2015, 42 pages.

Abraham, S.M. et al., "Initiating Actions Responsive to User Expressions of a User While Reading Media Content", U.S. Appl. No. 16/409,874, filed May 13, 2019, 42 pages.

Abraham, S.M. et al., "Initiating Actions Responsive to User Expressions of a User While Reading Media Content", U.S. Appl. No. 16/411,011, filed May 13, 2019, 42 pages.

IBM: List of IBM Patents or Patent Applications Treated as Related, 2 pg.

* cited by examiner

INITIATING ACTIONS RESPONSIVE TO USER EXPRESSIONS OF A USER WHILE READING MEDIA CONTENT

BACKGROUND

The present invention relates to electronic reading devices.

The reading of books has been a universally popular pastime from time immemorial. Beginning in the latter half of the twentieth century, the use of audiobooks also began to gain in popularity; people could listen to books in their cars while driving, listen to books while exercising, etc. Initially, audiobooks were available on cassette tapes which people could listen to using cassette tape players. Beginning in the 1990's, however, audiobooks became available in a variety of digital format compatible with portable music players (e.g., in MP3, AAC, WMA, AIFF, WAV, etc. file formats), which further spurred popularity of audiobooks. Proceeding into the twenty-first century, corresponding with the rapid expansion in the use of tablet computers and other types of electronic reading devices, electronic books (eBooks) also have gained widespread popularity. Due to the popularity of audiobooks and eBooks, millions of books currently are available in both audiobook and eBook formats.

SUMMARY

A method includes presenting on a display a first media content including text. The method also includes tracking, using an image detector, user expressions of a user while the user is reading the text of the first media content presented on the display, tracking the user expressions including tracking eye movement of the user. The method also includes generating user expression data based, at least in part, on the tracking of the user expressions of the user. The method also includes determining whether the user expression data indicates that the user gazes at a portion of the text presented on the display for a period exceeding a threshold value. The method also includes, responsive to determining that the user expression data indicates that the user gazes at a portion of the text presented on the display for a period exceeding the threshold value, automatically identifying, using a processor processing the user expression data, information contained in the portion of the text at which the user gazes for the period exceeding the threshold value, the information contained in the portion of the text including a plurality of words or terms that, together, convey a context beyond a meaning of any one of the plurality of words or terms, automatically identifying at least a second media content that provides further explanation of the information contained in the portion of the text and that satisfies at least a first user specified criteria, and presenting on the display the second media content or a link to the second media content.

A system includes a processor programmed to initiate executable operations. The executable operations include presenting on a display a first media content comprising text. The executable operations also include tracking, using an image detector, user expressions of a user while the user is reading the text of the first media content presented on the display, tracking the user expressions including tracking eye movement of the user. The executable operations also include generating user expression data based, at least in part, on the tracking of the user expressions of the user. The executable operations also include determining whether the user expression data indicates that the user gazes at a portion of the text presented on the display for a period exceeding a threshold value. The executable operations also include, responsive to determining that the user expression data indicates that the user gazes at a portion of the text presented on the display for a period exceeding the threshold value, automatically identifying, by processing the user expression data, information contained in the portion of the text at which the user gazes for the period exceeding the threshold value, the information contained in the portion of the text including a plurality of words or terms that, together, convey a context beyond a meaning of any one of the plurality of words or terms, automatically identifying at least a second media content that provides further explanation of the information contained in the portion of the text and that satisfies at least a first user specified criteria, and presenting on the display the second media content or a link to the second media content.

A computer program includes a computer readable storage medium having program code stored thereon. The program code is executable by a processor to perform a method. The method includes presenting, by the processor, on a display a first media content including text. The method also includes tracking, using an image detector, user expressions of a user while the user is reading the text of the first media content presented on the display, tracking the user expressions including tracking eye movement of the user. The method also includes generating, by the processor, user expression data based, at least in part, on the tracking of the user expressions of the user. The method also includes determining, by the processor, whether the user expression data indicates that the user gazes at a portion of the text presented on the display for a period exceeding a threshold value. The method also includes, responsive to determining that the user expression data indicates that the user gazes at a portion of the text presented on the display for a period exceeding the threshold value, automatically identifying, by the processor processing the user expression data, information contained in the portion of the text at which the user gazes for the period exceeding the threshold value, the information contained in the portion of the text including a plurality of words or terms that, together, convey a context beyond a meaning of any one of the plurality of words or terms, automatically identifying, by the processor, at least a second media content that provides further explanation of the information contained in the portion of the text and that satisfies at least a first user specified criteria, and presenting, by the processor, on the display the second media content or a link to the second media content.

DETAILED DESCRIPTION

Figure 1:
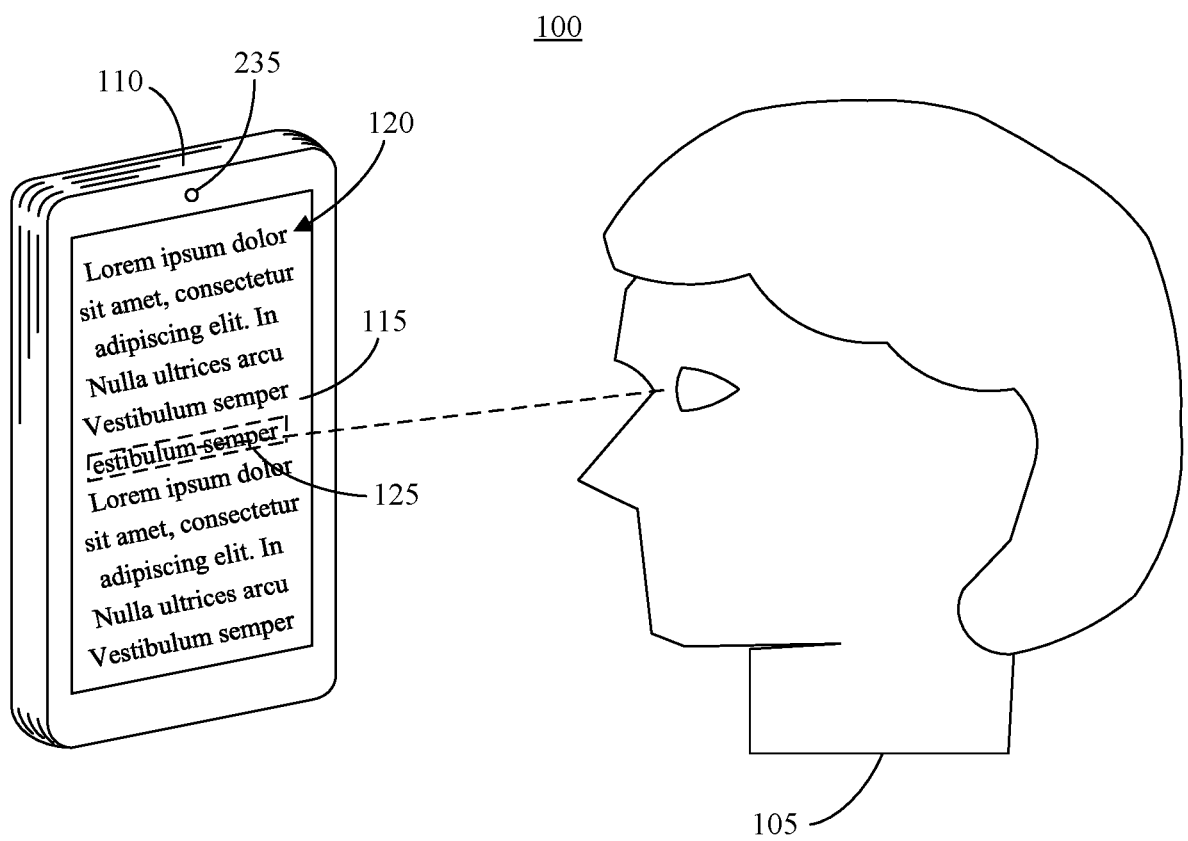
FIG. 1 is a pictorial view of a user reading media content presented on a display of an electronic reading device.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to electronic reading devices and, more particularly, to presenting, to a user, information related to media content presented by an electronic reading device. In accordance with the inventive arrangements disclosed herein, media content can be presented to a user on a display of an electronic reading device. While the media content is presented on the display, expressions of the user, including eye movement of the user, can be tracked by the electronic reading device to generate user expression data. The user expression data can be processed to initiate any number of actions, including generating electronic bookmarks, identifying other media content that may be of interest to the user, identify other media content that provides reviews of the media content, identify other media content that provides information to enrich a user's understanding of the media content, initiating conversations related to the media content among a plurality of users, etc.

Several definitions that apply throughout this document now will be presented.

As defined herein, the term "user expression" means one or more motions or positions of eyes of a user and/or muscles beneath the skin of a user. A user expression can be, for example, a facial gesture, eye movement, and the like.

As defined herein, the term "gaze" means to look steadily and intently.

As defined herein, the term "media content" means audio, video, images and/or text configured for presentation on a display.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or the like.

As defined herein, the term "automatically" means without user intervention.

As defined herein, the term "user" means a person (i.e., a human being).

FIG. 1 is a pictorial view 100 of a user 105 reading media content 120 presented on a display 115 of an electronic reading device 110. The electronic reading device 110 can be implemented in the form of any system including a processor and memory that is capable of performing the functions and/or operations described within this specification. For example, the electronic reading device 110 can be, for example, an e-book reader, a tablet computer, a smart phone, a mobile computer, a laptop computer, a netbook computer, a desktop computer, or the like. The media content 120 can be, for example, a book, a short story, an article, a published paper, a poem, or any other media content including text that may be presented on a display.

Figure 2:
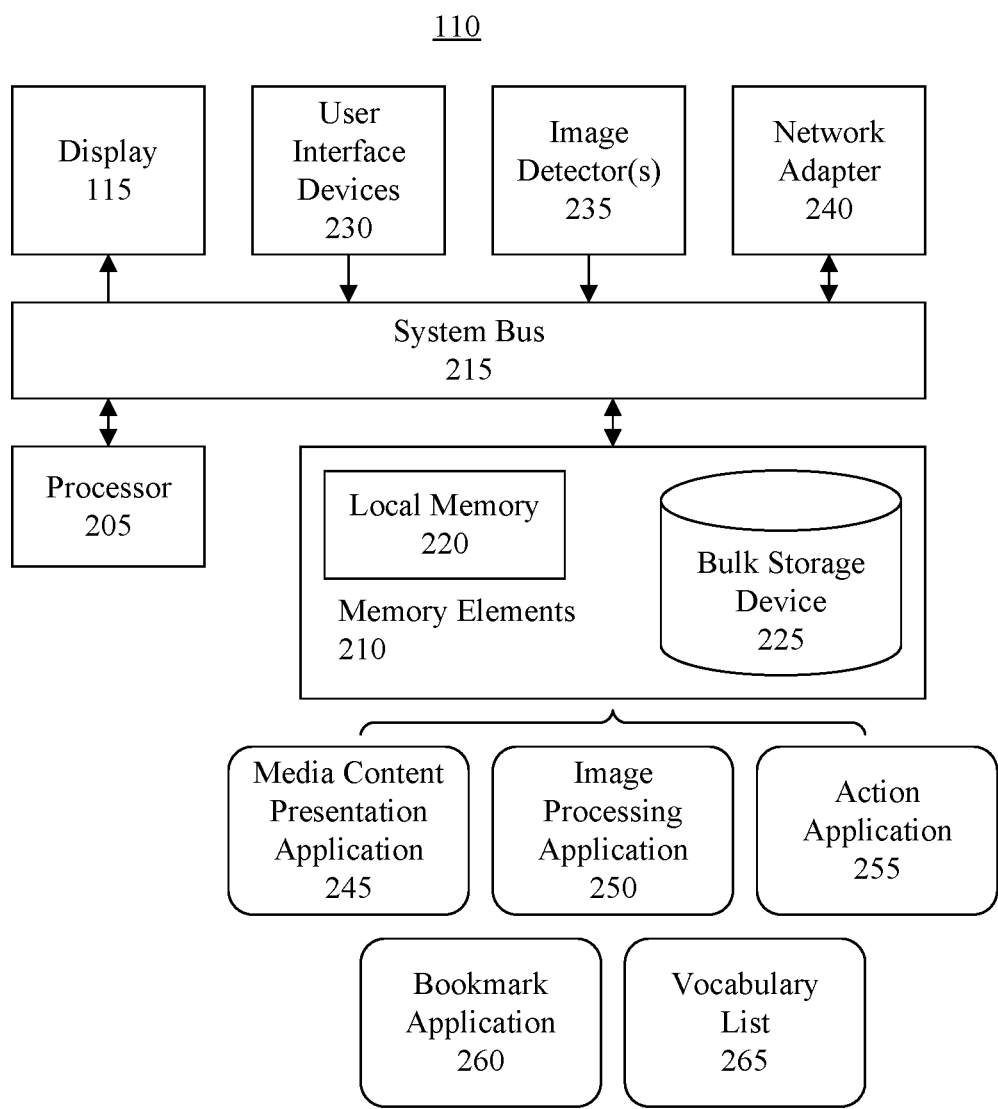
FIG. 2 is a block diagram illustrating example architecture for electronic reading device.

FIG. 2 is a block diagram illustrating example architecture for electronic reading device 110. The electronic reading device 110 can include at least one processor 205 (e.g., a central processing unit) coupled to memory elements 210 through a system bus 215 or other suitable circuitry. As such, the electronic reading device 110 can store program code within the memory elements 210. The processor 205 can execute the program code accessed from the memory elements 210 via the system bus 215.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as a hard disk drive (HDD), solid state drive (SSD), or other persistent data storage device. The electronic reading device 110 also can include one or more cache memories (not shown) that provide temporary storage of at least some program code in order to reduce the number of times program code must be retrieved from the bulk storage device 225 during execution.

Input/output (I/O) devices such as the display 115 can be coupled to the electronic reading device 110. In one arrangement, the display 115 can be a touchscreen which not only presents media content, but also senses one or more user gestures in the form of touches or swipes of the touchscreen. In another arrangement, one or more additional user interface devices 230 (e.g., a keypad, a keyboard, a mouse, a touchpad, audio input transducers, audio output transducers, or the like) can be coupled to the electronic reading device 110 to receive user inputs, as is known to those skilled in the art. The I/O devices can be coupled to the electronic reading device 110 either directly or through intervening I/O controllers. For example, the display 115 can be coupled to the electronic reading device 110 via a graphics processing unit (GPU), which may be a component of the processor 205 or a discrete device.

One or more image detectors 235 also can be coupled to electronic reading device 110. The image detector(s) 235 can be configured to capture images of the user 105, for example facial images. An image detector can be embodied as a charge-coupled device (CCD) camera or any other device suitable for capturing user images. The image detector(s) 235 can communicate image data corresponding to the captured images to the processor 205 for further processing.

One or more network adapters 240 also can be coupled to electronic reading device 110 to enable the electronic reading device 110 to become coupled to other systems, computer systems, remote printers, and/or remote storage devices through intervening private or public networks. Modems, cable modems, transceivers, and Ethernet cards are examples of different types of network adapters 240 that can be used with the electronic reading device 110.

As pictured in FIG. 2, the memory elements 210 can store the components of the electronic reading device 110, for example a media content presentation application 245, an image processing application (or service) 250, an electronic bookmark application (or service) 260 and an action application (or service) 255. Being implemented in the form of executable program code, the media content presentation application 245, image processing application 250, electronic bookmark application 260 and action application 255 can be executed by the processor 205 of the electronic reading device 110 and, as such, can be considered part of the electronic reading device 110. The media content presentation application 245, in particular, can be any application suitable for presenting media content on the display 115 of the electronic reading device 110, for example visually and/or audibly. In one non-limiting arrangement, a first content presentation application can be configured to present media content visually and a second content presentation application can be configured to present media content audibly.

Data output by the media content presentation application 245, imaging processing application, 250, the action application 255 and the electronic bookmark application 260 can be output to, and stored within, the memory elements 210, written to the display 115 or other peripheral output device, played as audible notifications, sent or transmitted to another system, exported, or the like. Moreover, the media content presentation application 245, image processing application 250, electronic bookmark application 260, action application 255, and data generated by these elements are functional data structures that impart functionality when employed as part of the electronic reading device 110.

Referring to FIGS. 1 and 2, the image detector(s) 235 can detect images of the user 105 while the user 105 is viewing the media content 120 and communicate corresponding image data to the processor 205. Executing the image processing application 250, the processor 205 can process the image data and generate corresponding user expression data. The user expression data can indicate not only where on the display 115 the user 105 currently is looking or gazing, but also indicate other portions of the display 115 where the user 105 has looked or gazed. In this regard, the image processing application 250 can include, or be communicatively linked to, an eye tracking application executed by the processor 205 that tracks movement of the user's eyes and identifies where the user 105 is looking or gazing.

The user expression data also can indicate an amount of time the user 105 has spent gazing at one or more portions of the display 115, indicate emotions expressed by the user 105, etc. For example, the processor 205 executing the image processing application 250 can process the image data to identify facial expressions indicating a number of emotions, such as intensity, surprise, joy, sadness, disappointment, etc. Identifying facial expressions indicating emotions, based on processing image data, is known to those skilled in the art. Responsive to generating the user expression data by the image processing application 250, the processor 205 can execute the action application 255 to process the user expression data and initiate any number of actions performed by the electronic reading device 110.

For example, responsive to detecting that the user 105 has stopped looking at the display for a period exceeding a threshold value, the action application 255 can process the user expression data to determine where on the display 115 the user 105 last looked and interface with the media content presentation application 245 to identify a portion of the media content 120 presented at that location on the display. In illustration, the action application 255 can identify a last portion (e.g., word, sentence, paragraph, page or chapter) of the media content 120 the user 105 read. Further, the action application 155 can initiate the electronic bookmark application 260 to automatically create and output, in real time, an electronic bookmark at that portion of the media content 120 and store the electronic bookmark on the on the electronic reading device 110. For instance, the electronic bookmark application 260 can store the electronic bookmark to the memory elements 210. The user 105 may close the media content presentation application 245 or access other media content. When the user 105 again views the media content 120 on the electronic reading device 110, the media content presentation application 245 can interface with the electronic bookmark application 260, access the electronic bookmark, and start presentation of the media content 120 beginning at the last electronic bookmark stored to the memory elements 210.

In one arrangement, in addition to, or in lieu of, displaying the media content 120 on the display, the media content presentation application 245 can audibly present the media content 120. In such an arrangement, the action application 255 can identify portion (e.g., a last word, sentence, paragraph, page or chapter) of the media content 120 that was audibly presented prior to the user 105 stopping or pausing playback of the media content 120. Further, the action application 255 can initiate the electronic bookmark application 260 to automatically generate an electronic bookmark at that portion of the media content 120 and store the electronic bookmark on the on the electronic reading device 110.

In illustration, if the media content 120 is available both in audio form and text form, the user 105 can choose to view or listen to the media content 120. Nonetheless, electronic bookmarks can be generated from, and applied to, both audio and visual forms of the media content 120. For example, the user 105 can stop reading the media content 120 and at some time begin listening to the media content 120. When the media content 120 is audibly played for the user 105, the media content presentation application can begin playback of the media content 120 from the last electronic bookmark, regardless of whether the last electronic bookmark was generated from a visual presentation or an audio presentation of the media content 120. Accordingly, the user 105 can switch between reading and listing to the media content 120, and presentation of the media content 120 can begin from, or immediately after, the portion of the media content 120 last read or listened to by the user 105.

At this point it should be noted that the arrangements described can be extended among a plurality of media content presentation application, as well extended among a plurality of devices. In one example, the user 105 can use a first media content presentation application to view the media content 120, and use a second media content presentation application to listen to the media content 120. Both of the media content presentation applications can interface with the electronic bookmark application 260 to access the electronic bookmarks to determine where to begin presentation of the media content. Thus, seamless presentation of the media content can be provided among the different media content presentation applications.

Figure 3:
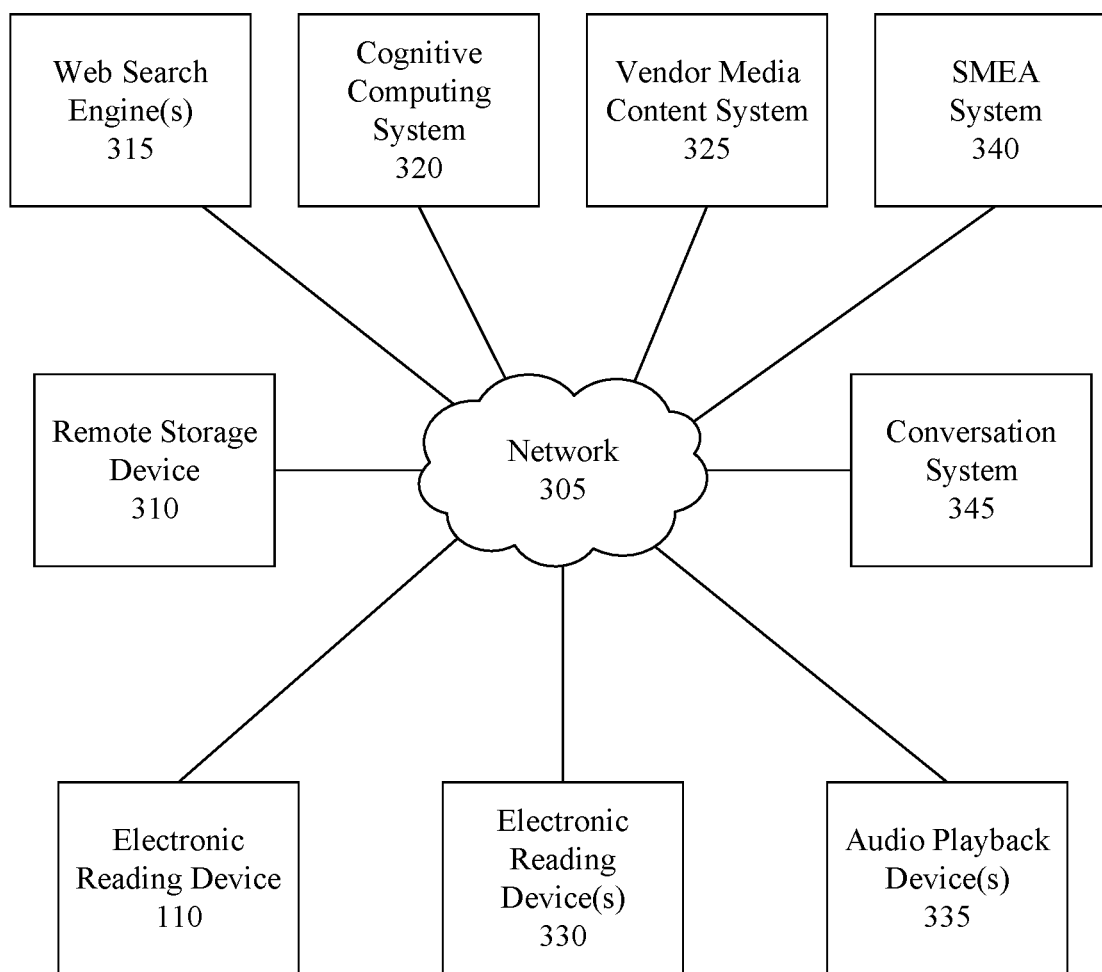
FIG. 3 is a block diagram illustrating an example of a communication system including an electronic reading device.

In a further example, referring to the example communication system 300 of FIG. 3, the electronic bookmarks can be stored to a remote storage device 310, for example to a network attached storage (NAS) or other suitable storage device. The electronic reading device 110 and other devices can be communicatively linked to the remote storage device 310 via a network 305. The network 305 may include connections, such as wire, wireless communication links, or fiber optic cables. The network 305 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or the like.

In this arrangement, the electronic bookmark created by the electronic bookmark application 260 can be made available to other devices, for example an electronic reading device 330, an audio playback device 335, and/or other devices. Thus, the user 105 can stop reading the media content 120 on the electronic reading device 110 and at some time begin reading the media content 120 on another electronic reading device 330 or listening to the media content 120 on the audio playback device 335. The other electronic reading device 330, or audio playback device 335, can include its own media content presentation application, action application and/or electronic bookmark application which begin audio playback of the media content 120 from, or immediately after, the portion last read by the user 105. Similarly, when the user 105 stops reading the media content on the other electronic reading device 330, or stops listening to the media content 120 on the audio playback device 335, a corresponding electronic bookmark can be automatically created. At some time the user 105 can again begin reading the multimedia content on the electronic reading device 110, and presentation of the media content 120 can begin from, or immediately after, the portion last read or listened to by the user 105 using another device 330, 335. Accordingly, the user 105 can switch between various devices 110, 330, 335 when reading and/or listing to the media content 120, and presentation of the media content 120 can begin from, or immediately after, the portion of the media content 120 last read or listened to by the user 105. Thus, use of the electronic bookmarks can provide a seamless presentation of the media content across a plurality of devices.

The present arrangements are not limited to generated electronic bookmarks. In another example, responsive to the action application 255 determining, by processing the user expression data, that the user 105 has gazed at a certain portion of the display 115 for a period exceeding a threshold value, the action application 255 can initiate the electronic reading device 110 to perform on or more actions. Such actions can include, but are not limited to, providing cross reference information to help the user 105 enrich his/her understanding of the media content presented at the portion of the display 115, provide an analysis of the media content presented at the portion of the display 115, initiate a discussion between the user 105 and other users pertaining to the media content, and so on, as will be described.

By way of example, the action application 255 can interface with the media content presentation application 245 to identify a portion of text presented in the media content 120 where the user currently is gazing, for example as previously described. In this example, the action application 255 can determine that the user is gazing at text 125 for a period exceeding a threshold value. Responsive to such determination, the action application 255 can automatically identify information contained in the text 125. For example, the action application 255 can identify in the text 125 a plurality of words, one or more phrases, one or more equations, and the like, that convey a context (or meaning) beyond a meaning of any one of a plurality of terms contained in the text 125.

In illustration, the text 125 can contain a plurality of terms that, together, convey a context beyond a meaning of any one of the plurality of terms. Thus, the definition of any one of the terms may not adequately convey the context of the plurality of terms. Moreover, the individual definitions of the plurality of terms, when combined, may not adequately convey the context. For example, if the text 125 includes the equation "$E=mc^2$," the equation conveys a context that means more than the individual definitions of the letters/symbols "E," "=," "m," "c," and "2." In another example, if the text 125 includes the phrase "control store," the text conveys a context that means more than the individual definitions of the words "control" and "store." Specifically, a "control store" is memory that stores the microcode of a processor. The definitions of the individual words "control" and "store," however, do not convey such meaning. In yet another example, if the text 125 includes the phrase "War of the Roses," such text conveys a context that means more than the individual definitions of the words "War," "of," "the" and "Roses." Still, there are numerous other phrases and terms that, together, convey a context that means more than the individual definitions of the words and the present arrangements are not limited in this regard.

Figure 4:
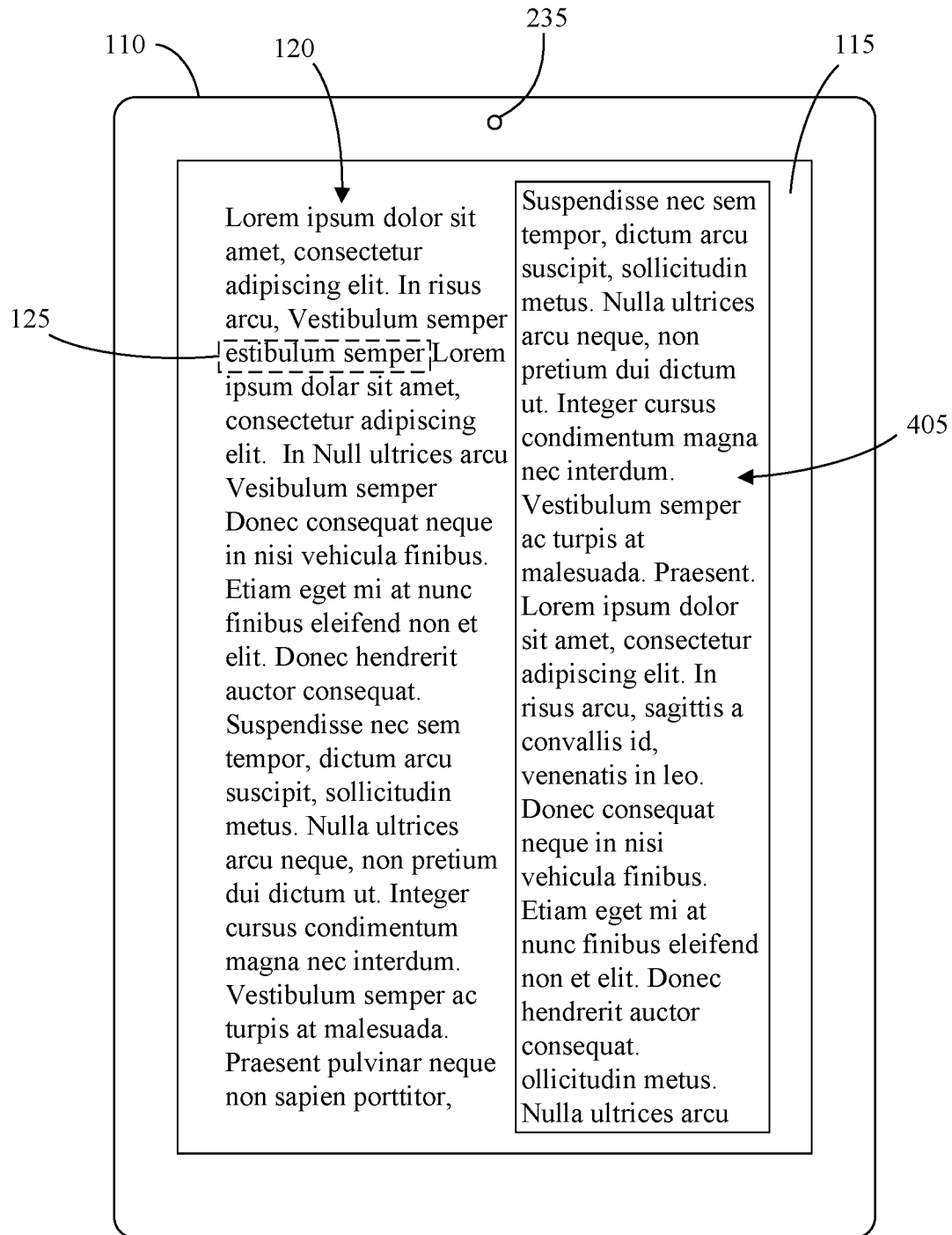
FIG. 4 depicts an example view of content presented on a display of an electronic reading device.

Responsive to identifying in the text 125 a plurality of words, one or more phrases, one or more equations, and the like, that convey a context beyond a meaning of any one of a plurality of terms contained in the text 125, the action application 255 can present additional information 405 related to the text 125, as shown in FIG. 4. Examples of the additional information 405 include, but are not limited to, media content accessed from one or more websites (or at least one portion thereof), one or more published papers (or at least one portion thereof), one or more articles (or at least one portion thereof), one or more blogs (or at least one portion thereof), one or more multimedia presentations, one or more video presentations, one or more audio presentations, one or more uniform resource identifiers (URIs), one or more uniform resource locators (URLs), one or more images, history information, archived data, and the like. The information 405 also can include a meaning of a phrase or equation, origin of the phrase or equation, usage of the phrase or equation, parts of speech in which a phrase is used, and so on.

In one arrangement, the action application 255 can make a determination as to whether to present the additional information 405 not only based on whether the user gazes at the text 125 for a period exceeding a threshold value, but also based on one or more emotions expressed by the user 105 as indicated by the user expression data. For example, if the user expression data indicates that the user appears confused, bewildered, skeptical, concerned or the like, the action application 255 can determine that presentation of the additional information 405 is warranted.

The action application 255 can interface with the media content presentation application 245 to reposition the media content 120 to make room for a new pane, window, text box, or the like, to be presented on the display 115. Further, the action application 255 can access the information 405 from one or more information sources and interface with the media content presentation application 245 to present the information on the display 115 in the new pane, window, text box, or another suitable region of the display 115. In another arrangement, the information 405 can be presented in a view presented on the display 115 that is triggered by a user selection of a menu item, icon or the like.

In one arrangement, the information 405 accessed by the action application 255 can be media content selected to help the user 105 enrich his/her understanding of the media content 120 and/or the text 125. For example, such media content can provide further explanation of information contained in the text 125. In illustration, if the text includes the equation "$E=mc^2$," the action application can retrieve information that explains that equation. Referring to FIGS. 1-4, in one arrangement, the action application 255 can access one or more web search engines 415 and provide to the web search engine(s) 315 the equation as a search parameter and initiate a corresponding web search. The action application 255 can interface with a web browser executed on the electronic reading device 110 to connect to the web search engine(s) 315, though this need not be the case. Indeed, the action application 255 can be configured to do so as a background task. Thus, the web browser need not be presented on the display 115 while the search takes place. In an arrangement in which the action application 255 interfaces with a web application to connect to the web search engine(s) 315, the web application can remain minimized while the search takes place or executed in the background so as not to be presented on the display 115.

In addition to, or in lieu of, performing a search using one or more web search engines 315, the action application 255 can be configured to access a cognitive computing system 320, such as a supercomputer processing system including at least one processor and memory, and initiate a search by the cognitive computing system to search for the information 405 corresponding to the text 125. IBM® Watson is an example of a cognitive computing system 320, but the present arrangements are not limited in this regard.

In one aspect of the present arrangements, the media content 120 can be parsed and mapped to a file, for example a metadata file. In one example, the media content 120 can be parsed and information contained in the media content 120 can be mapped to the file by the electronic reading device 110, for example using a parsing application (not shown), responsive to the media content 120 being downloaded, for example from a vendor media content system 325, or responsive to the media content 120 being initially presented. The vendor media content system can include a processing system including at least one processor and memory. In another example, the media content 120 can be parsed and the information mapped to the file by some other system, for example the cognitive computing system 320, and the file can be accessed by the electronic reading device 110 at some point, for example when the media content 120 is downloaded from a vendor media content system 325. In this regard, the vendor media content system 325 can be communicatively linked to the cognitive computing system 320 via the network 305.

The file can indicate various phrases, equations, etc. included in the media content 120 and, for one or more of the phrases, equations, etc., include an indication of the meaning and/or context. References related to one or more of the phrases, equations, etc. also can be provided in the file, or links (e.g., hyperlinks) to such references can be provided in the file, for example as one or more URIs and/or URLs. The references also can include, for example, media content, one or more published papers (or at least one portion thereof), one or more articles (or at least one portion thereof), one or more multimedia presentations (or at least one portion thereof), one or more images, history information, archived data, and the like.

In one aspect of the present arrangements, a vocabulary list 265 personalized for the user 105 can be maintained by the action application 255, for example in a file stored on the electronic reading device 110 or another storage location assigned to the user 105 (e.g., on the remote storage device 310). The action application 255 can add to the vocabulary list 265 each new word encountered by the user while reading or listening to the media content 120. Further, for each new word, the action application 255 can access a definition of the word and add that definition to the vocabulary list 265. For example, the action application 255 can access a dictionary stored locally on the electronic reading device 110 and/or access one or more online dictionaries to obtain the definitions. If, when reading the media content 120, or any other media content, the user gazes at a particular word for a period exceeding a threshold value, the action application 255 can access the definition of the word from the vocabulary list 265 and present to the user 105 the definition of that word, for example via the media content presentation application 245. In one arrangement, via the media content presentation application 245 or another suitable application, the user 105 can access the vocabulary list 265 and change the definitions of words, add comments related to the words, etc. The comments added for a word also can be presented to the user 105 responsive to the user gazing at the word for a period exceeding a threshold value.

In a further arrangement, the user 105 can specify criteria for the information 405 that is presented. For example, the user 105 can specify that information related to education, entertainment, science, art, reviews of the media content 120 (or a portion thereof), an in depth analysis of reviews of the media content 120 (or a portion thereof), etc. is to be presented. The user also can specify that all possible references or related data is to be presented. In one aspect, the action application 255 and/or media content presentation application 245 can present a user interface element (e.g., a menu or the like) to the user 105 via which the user may specify the criteria. The user specified criteria can be stored as user preferences by the action application 255. Accordingly, the action application 255 can limit the information 405 that is presented to information that satisfies the criteria specified by the user 105.

In one example, the information 405 can include reviews of the media content 120. The reviews can address the media content 120 in total and/or address certain portions of the media content 120. For example, if the user 105 is reading a particular page, passage or chapter, the information 405 can include reviews of that particular page, passage or chapter. In illustration, if the media content 120 is a book downloaded from a vendor media content system 325, that system 325 may have stored user reviews of the book. The action application can access such reviews and present the reviews as the information 405.

In another arrangement, the information 405 can include an in-depth analysis of a plurality of reviews of the media content 120, or one or more portions thereof. The analysis can be, for example, an in-depth analysis of reviews pertaining to particular chapters or passages of the media content 120. For example, the analysis can provide scores indicated by, or assigned to, each review. The analysis also can be indicate total scores (e.g., averaged or summed) for a plurality of scores related to each chapter, the media content 120 as a whole, and/or the like.

Further, processing the user expression data, the action application 255 can determine a sentiment of the user 105 while reading a particular page, passage or chapter of the media content 120. For example, the action application 255 can identify facial gestures and eye movement indicated by the user expression data. Based on the user expression data, the action application 255 can generate user sentiment data indicating the particular page, passage or chapter of the media content 120 and the user's sentiment while reading such. The action application 255 can communicate the user sentiment data to another system, such as a system that provides reviews of the media content 120 (e.g., the vendor media content system 325). Such system can assign review scores to the media content 120, or chapters or other portions of the media content, based on the user sentiment data.

In one arrangement, a social media exploratory analysis (SMEA) can be used to track sentiment of the user 105 and other users. For example, referring to FIG. 3, in addition to, or in lieu of, processing the user expression data, the action application 255 can communicate the user expression data to a SMEA server 340, which can process the user expression data to determine the sentiment of the user 105. The SMEA server 340 can include a processing system including at least one processor and memory. In illustration, the action application 224 can generate a correlation between an electronic bookmark generated for a portion of the media content 120 that includes the text 125 at which the user 105 is gazing. The action application 255 can communicate to the SMEA server 340 the electronic bookmark and the correlation with the user expression data. Accordingly, the SMEA server can determine the sentiment of the user 105 while reading the portion of the media content 120 that includes the text 125 at which the user 105 is gazing.

The SMEA server 340 also can process the user expression data, electronic bookmarks and correlations generated for other users reading the media content 120 or reading the portion of the media content 120 that includes the text 125. Such other user expression data can be generated for the users, and communicated to the SMEA server 340, by respective electronic reading devices 330 of the users. Based on the expression data, the SMEA server 340 can determine the sentiment of the other users while reading the media content 120 or the portion of the media content 120 including the text 125. The SMEA server 340 can, based on the sentiment of the user 105 and the user sentiments of other users, accumulate user sentiment data pertaining to the media content 120, or portions thereof. Further, the SMEA server 340 can classify the user sentiments according to any number of categories, examples of which include, but are not limited to, demographics, age, socio-economic backgrounds, and the like. User sentiment data generated by the SMEA server 340 can be communicated to another system, such as a system that provides reviews of the media content 120, for instance the vendor media content system 325.

When reviews of the media content 120 are provided to other users, the system 325 can include in the reviews the user sentiment. For example, the system 325 can provide scores, text, emoticons, emojis, or the like indicating sentiment of other users for the particular page, passage or chapter of the media content 120. In another aspect, the system 325 can provide a graphical view indicating the sentiment of various users. The graphical view can indicate a number or percentage of users exhibiting certain sentiments while reading the particular page, passage or chapter of the media content 120. For example, the graphical view can indicate statistics (e.g., a score, average score, percentage, etc.) pertaining to users exhibiting excitement, joy, sadness, and so on. Of course, the sentiment other users can be accessed from the system by the action application 255 and presented as, or as a portion of, the information 405. In one aspect, the sentiments of other users that are presented to the user 105 can be sentiments of other users with the same demographics, age, socio-economic backgrounds, etc., of the user 105.

In a further arrangement, based on the sentiment of the user 105 while reading a particular page, passage or chapter of the media content 120, the action application 255 can identify other media content that may be of interest to the user 105, and indicate such other media content in the information 405. In illustration, if the user expression data indicates excitement, joy, intensity, etc. while reading the media content 120, the action application 255 can determine that the user may be interested in reading other media content that is in the same genre as the media content 120. Further, the action application 255 can identify other media content that causes other users to express the same sentiments.

To identify the other media content, the action application 255 can access one or more other systems which indicate genres of various media content and/or track the sentiment of various users reading various media content, for example a system that provides media content (e.g., the vendor media content system 325). The action application 255 can query such system 325 for a listing of other media content in the same genre, media content for which users have exhibited the same sentiment as the user 105 has exhibited while reading the media content 120 and/or media content that meets user specified criteria. The system 325 can respond to the query with a listing of such other media content and present the listing to the user as, or as a portion of, the information 405. In a further arrangement, the system 325 can provide to the action application 255 a listing of media content that have been read, or that are being read, by contacts associated with the user 105. Such media content also can be presented to the user in the listing along with an indication of which contacts associated with the user who have read, or are currently reading, the media content. In this regard, a contact list of the user, for example a contact list including other users who participate in the same book club, reading group, social network, etc., can be shared with the system by the action application 255.

The user can select any media content provided in the listing to initiate purchase and/or download of the selected media content. In one aspect, the vendor media content system 325 can present an offer, conveyed to the user on the electronic reading device 110 by the action application 255, to purchase the media content. For example, the action application 255 can interface with the media content presentation application 245 to present such offer. The user can accept the offer by adding the other media content to a shopping cart, or otherwise initiating purchase of the other media content.

In another aspect of the present arrangements, the action application 255 can provide as, or as a portion of, the information 405 the location (e.g., page number, chapter, etc.) in the media content 120 where the user 105 currently is reading. In another arrangement, such information can be presented in a pane, window, view, etc. responsive to the user 105 selecting a menu item, icon or the like. Moreover, such pane, window, view, etc. can be presented to the user regardless of whether the user currently is reading the media content on the electronic reading device 110. In this regard, the action application 255 can track the progress of the user 105 reading and/or listening to the media content 120 across various media content presentation applications and/or devices. For example, based on electronic bookmarks that are generated for user based on the user listening to the media content 120 and/or reading the media content 120, the action application 255 can keep the progress of the user reading the media content 120 updated, even when the user last read and/or listened to the media content 120 using other devices. Further, the action application 255 also can track the user's reading speed, time of day, etc., and present this information to the user 105.

The action application 255 also can communicate to an external system, such as the vendor media content system 325, a conversation system 345 (e.g., a social networking system, a book club server, a reading group server, or the like, which includes a processing system including at least one processor and memory), data indicating where the user 105 currently is reading or where the user last read. That data can be shared by the external system with other users who are reading the same media content 120. In one arrangement, the other users with whom the data is shared can be users who are contacts of the user 105 or users who belong to a same forum, book club, reading group, social network, etc. Moreover, the action application 255 further can access from the external system data indicating the locations in the media content 120 where the other users currently are reading or have read. Such data can be presented as, or as a portion of, the information 405 and/or presented in another pane, window, view, etc. The data indicating the locations in the media content 120 where the other users currently are reading or have read can be generated by the external system processing electronic bookmarks associated with the other users. Such electronic bookmarks can be generated for the other users, for example, as described herein with respect to generating electronic bookmarks for the user 105. In a further aspect, the other users can generate their electronic bookmarks by entering user inputs to their respective electronic reading devices 330.

The data indicating the locations in the media content 120 where the user 105 and other users currently are reading can include a timeline indicating when the various users read specific chapters, pages, etc. Any of the users, including the user 105, can initiate a discussion, debate or forum to discuss information related to the media content 120. For example, if the user 105 is reading, or has just completed reading, a particular chapter, the user 105 can enter one or more user input into the electronic reading device 110 to trigger the action application 255 to select a system via which a conversation (e.g., discussion, debate or forum) may be initiated, for example on the conversation system 345, and initiate on that system the conversation to discuss that chapter with other users who have read, have recently read, or are reading that chapter. The conversation can be initiated by starting a new thread on the conversation system, creating a new post in an existing thread related to the subject of the conversation, or the like.

In illustration, the user 105 can select the chapter from the timeline or other chapter listing to initiate the conversation regarding the chapter with other users who have read or are reading the chapter. The user 105 also can select specific users from a list of users to initiate the conversation regarding the chapter and/or the media content 120 in general. By way of example, the user 105 can select the chapter and/or users from a list of chapters and/or users and select a menu item to initiate the conversation. Responsive to the user 105 selecting the menu item, the action application 255 can select the chapter selected by the user and send, or initiate the conversation system 345 to send, an invitation to the other users to participate in the conversation.

In another arrangement, rather than the user selecting the chapter and/or the users, the action application 255 can detect where the user currently is reading, for example, as previously described, and responsive to receiving an indication from the user that the user desires to participate in a conversation, automatically select as recipients of the invitation other users who are reading or have read the same portion of the media content 120 as the user. In this regard, users who have not yet read the chapter can be excluded from the conversation, and thus need not receive an invitation to participate in the conversation. For example, if the user selects the chapter and chooses to initiate the conversation to discuss that chapter, the action application 255 can automatically select other users who are reading, or have read, that chapter, and the invitation can be sent exclusively to such other users. Users who have not read that chapter can be excluded from the invitation. In one aspect, the invitation can be presented to the user 105 before the invitation is sent to the other users and the user 105 can enter comments/information to be included in the invitation, for example topics for discussion, etc., add to, or remove from, the invitation other users, and the like.

In one aspect, content posted by the user 105 (e.g., user comments, images, audio/video information, links, etc.) in the conversation can be saved to a storage device, for example by the vendor media content system 325, the conversation system 345, etc., and shared with other users who reach the same portion of the media content 120 discussed in the forum. In this regard, content posted by other users (e.g., user comments, images, audio/video information, links, etc.) regarding a portion of the media content 120 reached by the user can be presented as, or as a portion of, the information 405 presented to the user 105.

Further, assuming that all users invited to participate in a conversation have at least reached a particular portion of the media content 120 (e.g., have at least reached the same chapter or page), their respective electronic reading devices and/or audio devices can audibly present the following portion of the media content 120 to the users, and their respective action applications 255 can track their progress in listening to the media content 120. In another arrangement, the users can meet at a location to collectively listen to the following portion. Each user can initiate his/her action application 255 to track the audio presentation of the media content 120, even if the media content 120 is presented by another device, for example using the electronic bookmarks previously described. For example, each user can be identified to the other device presenting the media content 120, and the other device can generate electronic bookmarks for each of the identified users. The electronic bookmarks can be communicated to each user's electronic reading device and/or other devices, or stored to a remote storage device 310 from which each user's electronic reading device and/or other devices can retrieve the electronic bookmarks.

Optionally, the user 105 can choose to share his/her vocabulary list 265 and/or information 405 (or a portion thereof) with other users. For example, the user can select other users with whom the user chooses to share the vocabulary list 265 and/or information 405, or the user can share the vocabulary list 265 and/or information 405 with each of the users the user 105 invites to participate in the conversation. Other users also can share their vocabulary lists and information obtained for them with the user 105. The user can review the other vocabulary lists and/or information 405 via the media content presentation application 245 or another suitable application.

Figure 5:
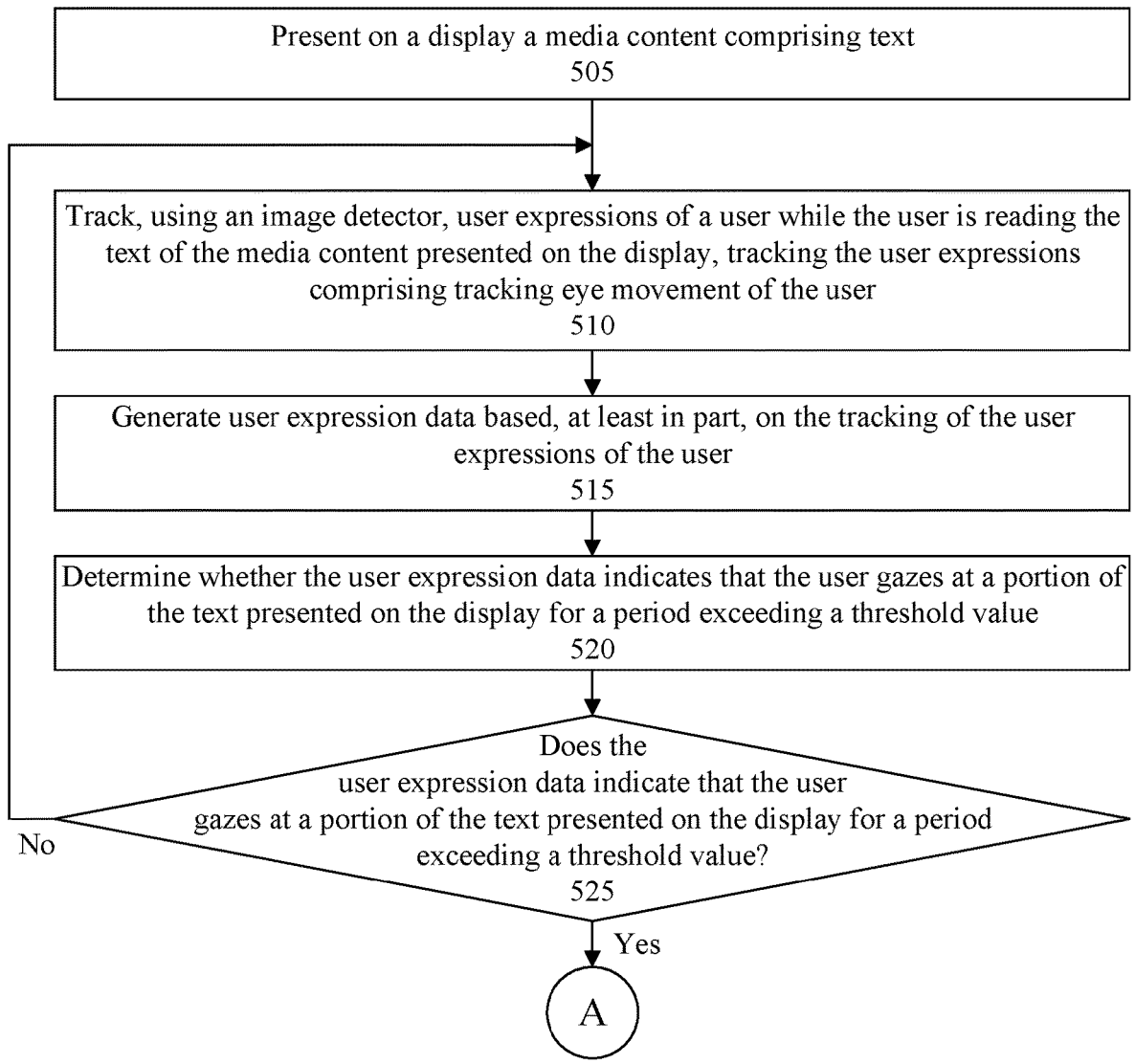
FIG. 5 is a flow chart illustrating an example of a method of determining whether a user gazes at a portion of text of first media content presented on a display.

FIG. 5 is a flow chart illustrating an example of a method 500 of determining whether a user gazes at a portion of text of first media content presented on a display, for example a display of an electronic reading device. At step 505, media content including text can be presented on a display. The first media content also can include images, audio, video, etc. At step 510, using an image detector, for example a camera of the electronic reading device, user expressions of a user can be tracked while the user is reading the media content. For example, eye movement of the user can be tracked. Facial gestures of the user also can be tracked.

At step 515, user expression data can be generated based, at least in part, on tracking the user expressions of the user. At step 520, a determination can be made as to whether the user expression data indicates that the user gazes at a portion of the text presented on the display for a period exceeding a threshold value. Proceeding to decision box 525, if the user data does not indicate that the user gazes at a portion of the text presented on the display for a period exceeding a threshold value, the process can return to step 510. If, however, the user data does indicate that the user gazes at a portion of the text presented on the display for a period exceeding a threshold value, any number of actions can be implemented, for example as described with regard to FIG. 6 and/or FIG. 7.

Figure 6:
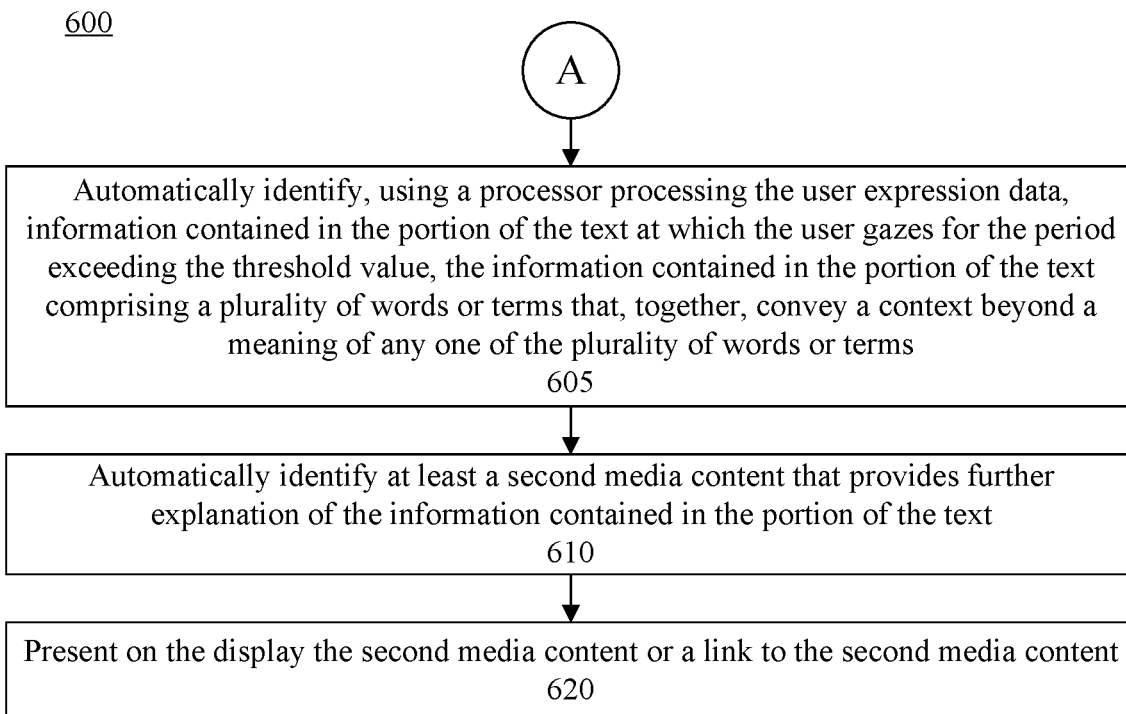
FIG. 6 is a flow chart illustrating an example of a method of presenting second media content to a user responsive to the user gazing at a portion of text presented in first media content.

FIG. 6 is a flow chart illustrating an example of a method 600 of presenting second media content to a user responsive to the user gazing at a portion of text presented in first media content. At step 605, using a processor processing the user expression data, information contained in the portion of the text at which the user gazes for the period exceeding the threshold value can be automatically identified. The information contained in the portion of the text can include a plurality of words or terms that, together, convey a context beyond a meaning of any one of the plurality of words or terms. At step 610, at least a second media content that provides further explanation of the information contained in the portion of the text can be automatically identified. At step 620, the second media content, or a link to the second media content, can be presented on the display.

Figure 7:
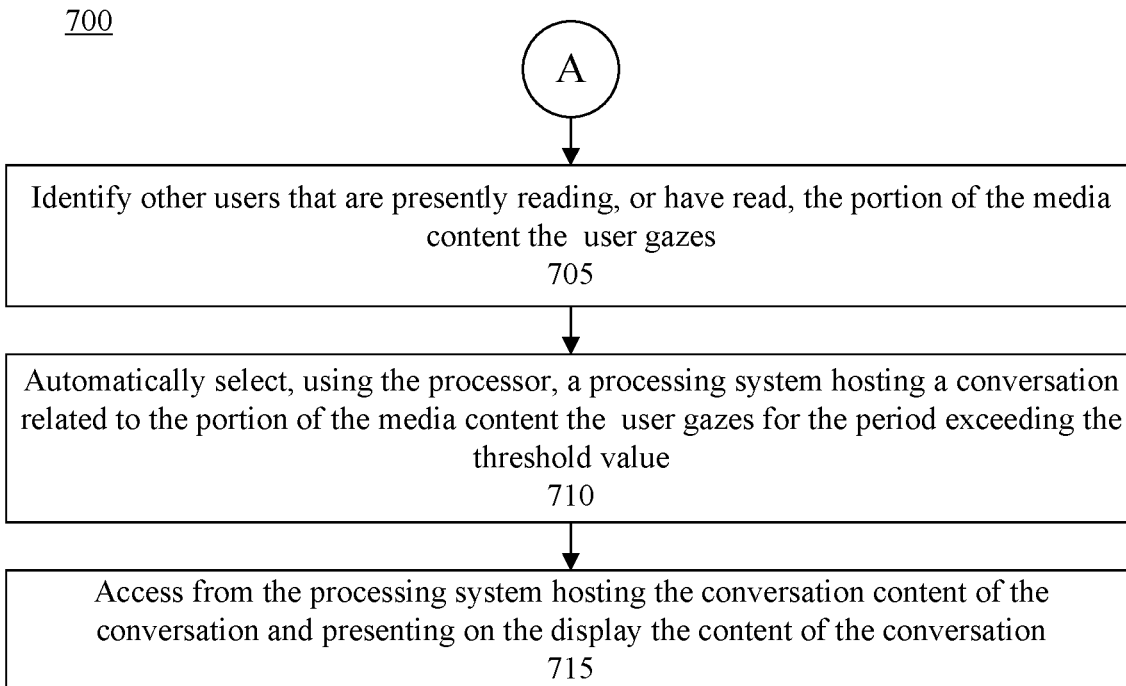
FIG. 7 is a flow chart illustrating an example of a method of presenting conversation content to a user responsive to the user gazing at a portion of text presented in first media content.

FIG. 7 is a flow chart illustrating an example of a method 700 of presenting conversation content to a user responsive to the user gazing at a portion of text presented in first media content. At step 705, other users that are presently reading, or have read, the portion of the media content the user gazes can be identified. At step 710, responsive to identifying the other users that are presently reading, or have read, the portion of the media content the user gazes, a processing system hosting a conversation related to the portion of the media content the user gazes for the period exceeding the threshold value can be automatically selected using the processor. At step 715, content of the conversation can be accessed from the processing system hosting the conversation and the content of the conversation can be presented on the display.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   presenting on a display a first media content comprising text;
   tracking, using an image detector, user expressions of a user while the user is reading the text of the first media content presented on the display, tracking the user expressions comprising tracking eye movement of the user; generating user expression data based, at least in part, on the tracking of the user expressions of the user;

determining whether the user expression data indicates that the user gazes at a portion of the text presented on the display for a period exceeding a threshold value;

responsive to determining that the user expression data indicates that the user gazes at a portion of the text presented on the display for a period exceeding the threshold value:

automatically identifying, using a processor processing the user expression data, information contained in the portion of the text at which the user gazes for the period exceeding the threshold value, the information contained in the portion of the text comprising a plurality of words or terms that, together, convey a context beyond a meaning of any one of the plurality of words or terms;

automatically identifying at least a second media content that provides further explanation of the information contained in the portion of the text and that satisfies at least a first user specified criteria;

presenting on the display the second media content or a link to the second media content;

identifying at least a second user specified criteria that specifies that an analysis of reviews of the first media content is to be presented;

accessing the analysis of reviews of the first media content from at least one information source; and presenting on the display the analysis of the reviews of the first media content.

2. The method of claim 1, further comprising:

automatically creating an electronic bookmark identifying a portion of the first media content including the portion of the first media content at which the user gazes; and generating a correlation between the electronic bookmark and the user expression data.

3. The method of claim 2, further comprising:

communicating, with the user expression data, the electronic bookmark and the correlation to another system configured to process the user expression data to identify a user sentiment of the user.

4. The method of claim 1, further comprising:

maintaining a personalized vocabulary list for the user; and adding to the personalized vocabulary list for the user each new word not already contained in the personalized vocabulary list for the user.

5. The method of claim 4, further comprising:

for each new word added to the personalized vocabulary list, accessing a definition of the new word and adding that definition to the personalized vocabulary list.

6. The method of claim 1, further comprising:

determining whether the user expression data indicates that the user gazes at a particular word presented on the display for a period exceeding a threshold value; and responsive to determining that the user expression data indicates that the user gazes at the particular word presented on the display for the period exceeding a threshold value, presenting to the user comments for the particular word previously added by the user to a personalized vocabulary list for the user.

7. A system, comprising:

a processor programmed to initiate executable operations comprising:

presenting on a display a first media content comprising text;

tracking, using an image detector, user expressions of a user while the user is reading the text of the first media content presented on the display, tracking the user expressions comprising tracking eye movement of the user;

generating user expression data based, at least in part, on the tracking of the user expressions of the user;

determining whether the user expression data indicates that the user gazes at a portion of the text presented on the display for a period exceeding a threshold value;

responsive to determining that the user expression data indicates that the user gazes at a portion of the text presented on the display for a period exceeding the threshold value:

automatically identifying, using a processor processing the user expression data, information contained in the portion of the text at which the user gazes for the period exceeding the threshold value, the information contained in the portion of the text comprising a plurality of words or terms that, together, convey a context beyond a meaning of any one of the plurality of words or terms;

automatically identifying at least a second media content that provides further explanation of the information contained in the portion of the text and that satisfies at least a first user specified criteria;

presenting on the display the second media content or a link to the second media content;

identifying at least a second user specified criteria that specifies that an analysis of reviews of the first media content is to be presented;

accessing the analysis of reviews of the first media content from at least one information source; and presenting on the display the analysis of the reviews of the first media content.

8. The system of claim 7, the executable operations further comprising:

automatically creating an electronic bookmark identifying a portion of the first media content including the portion of the first media content at which the user gazes; and generating a correlation between the electronic bookmark and the user expression data.

9. The system of claim 8, the executable operations further comprising:

communicating, with the user expression data, the electronic bookmark and the correlation to another system configured to process the user expression data to identify a user sentiment of the user.

10. The system of claim 7, the executable operations further comprising:

maintaining a personalized vocabulary list for the user; and adding to the personalized vocabulary list for the user each new word not already contained in the personalized vocabulary list for the user.

11. The system of claim 10, the executable operations further comprising:

for each new word added to the personalized vocabulary list, accessing a definition of the new word and adding that definition to the personalized vocabulary list.

12. The system of claim 7, the executable operations further comprising:
- determining whether the user expression data indicates that the user gazes at a particular word presented on the display for a period exceeding a threshold value; and
- responsive to determining that the user expression data indicates that the user gazes at the particular word presented on the display for the period exceeding a threshold value, presenting to the user comments for the particular word previously added by the user to a personalized vocabulary list for the user.

13. A computer program product comprising a computer readable storage medium having program code stored thereon, the program code executable by a processor to perform a method comprising:
- presenting on a display a first media content comprising text;
- tracking, using an image detector, user expressions of a user while the user is reading the text of the first media content presented on the display, tracking the user expressions comprising tracking eye movement of the user;
- generating user expression data based, at least in part, on the tracking of the user expressions of the user;
- determining whether the user expression data indicates that the user gazes at a portion of the text presented on the display for a period exceeding a threshold value;
- responsive to determining that the user expression data indicates that the user gazes at a portion of the text presented on the display for a period exceeding the threshold value:
  - automatically identifying, by the processor processing the user expression data, information contained in the portion of the text at which the user gazes for the period exceeding the threshold value, the information contained in the portion of the text comprising a plurality of words or terms that, together, convey a context beyond a meaning of any one of the plurality of words or terms;
  - automatically identifying at least a second media content that provides further explanation of the information contained in the portion of the text and that satisfies at least a first user specified criteria;
  - presenting on the display the second media content or a link to the second media content;
  - identifying at least a second user specified criteria that specifies that an analysis of reviews of the first media content is to be presented;
  - accessing the analysis of reviews of the first media content from at least one information source; and
  - presenting on the display the analysis of the reviews of the first media content.

14. The computer program product of claim 13, the method further comprising:
- automatically creating an electronic bookmark identifying a portion of the first media content including the portion of the first media content at which the user gazes; and
- generating a correlation between the electronic bookmark and the user expression data.

15. The computer program product of claim 14, the method further comprising:
- communicating, with the user expression data, the electronic bookmark and the correlation to another system configured to process the user expression data to identify a user sentiment of the user.

16. The computer program product of claim 13, the method further comprising:
- maintaining a personalized vocabulary list for the user; and
- adding to the personalized vocabulary list for the user each new word not already contained in the personalized vocabulary list for the user.

17. The computer program product of claim 16, the method further comprising:
- for each new word added to the personalized vocabulary list, accessing a definition of the new word and adding that definition to the personalized vocabulary list.

* * * * *